United States Patent [19]

Lee

[11] Patent Number: 5,329,546
[45] Date of Patent: Jul. 12, 1994

[54] CLOCK RECOVERY STABILIZATION METHOD AND CIRCUIT IN A RECEIVER OF A CODE DIVISION MULTIPLE ACCESS/DIRECT SEQUENCE (CDMA/DS) SYSTEM

[75] Inventor: Chang-Yong Lee, Suwon, Rep. of Korea

[73] Assignee: SamSung Electronics Co., Ltd., Suwon, Rep. of Korea

[21] Appl. No.: 22,361

[22] Filed: Feb. 25, 1993

[30] Foreign Application Priority Data

Nov. 27, 1992 [KR] Rep. of Korea ............... 22617/1992

[51] Int. Cl.⁵ .................................................. H04L 27/30
[52] U.S. Cl. ........................................................... 375/1
[58] Field of Search ............................................. 375/1

[56] References Cited

U.S. PATENT DOCUMENTS

| | | | |
|---|---|---|---|
| 4,291,409 | 9/1981 | Weinberg et al. | 375/1 |
| 4,291,410 | 9/1981 | Caples et al. | 375/1 |
| 4,308,617 | 12/1981 | German, Jr. | 375/1 |
| 4,485,477 | 11/1984 | Nossen | 375/1 |
| 4,672,629 | 6/1987 | Beier | 375/1 |
| 4,942,590 | 6/1990 | Terada | 371/1 |
| 4,969,160 | 11/1990 | Kingston | 375/1 |
| 4,972,430 | 11/1990 | Cantwell | 375/1 |
| 5,081,644 | 1/1992 | Uchida et al. | 375/1 |
| 5,120,997 | 6/1992 | Cantwell | 375/1 |
| 5,121,407 | 6/1992 | Partyka et al. | 375/1 |
| 5,151,921 | 9/1992 | Hashimoto | 375/1 |
| 5,179,573 | 1/1993 | Paradise | 375/1 |
| 5,222,075 | 6/1993 | Richley | 375/1 |

*Primary Examiner*—Salvatore Cangialosi
*Attorney, Agent, or Firm*—Robert E. Bushnell

[57] ABSTRACT

A process and circuit for down-converting a spread spectrum signal by first and second local oscillating signals, amplifying the down-converted signal, separating the amplified signal into intermediate base band signals of I and Q channels, and demodulating the intermediate base band signals in a receiver of a code division multiple access/direct sequence system. The amplified signal is squared to provide an intermediate frequency signal of $2f_{IF}$, which is then band pass filtered. The filtered signal is limiting-amplified to be maintained at a given level. A deviation under 1 dB of an input level is automatically adjusted in order to supplement an input dynamic range of the limiting-amplified signal, and the adjusted signal is divided to produce and intermediate frequency signal having a frequency of $f_{IF}$. Moreover, a clock signal is recovered by the limiting-amplification of an oscillation signal generated in response to a phase difference obtained by comparing the intermediate frequency signal with a feedback signal of a recovery clock. The feedback signal is derived from the clock signal by dividing the clock signal after amplification. The clock signal is further divided and supplied as a stable carrier signal to a phase shifter via a band pass filter and amplifier. The two phase shifted carrier signals are mixed with the amplified signal in order to separate the amplified signal into the intermediate base band signals of the I and Q channels.

22 Claims, 2 Drawing Sheets

CLOCK RECOVERY STABILIZATION METHOD AND CIRCUIT IN A RECEIVER OF A CODE DIVISION MULTIPLE ACCESS/DIRECT SEQUENCE (CDMA/DS) SYSTEM

BACKGROUND OF THE INVENTION

The present invention relates to a clock recovery circuit in a synchronous receiver of a code division multiple access/direct sequence (CDMA/DS) communication system, and more particularly, to a process and circuit for extracting a stable clock signal by maintaining a constant input level in order to recover a clock signal from a received signal.

The code division multiple access (i.e., CDMA) system is one example of multiple access communication systems. A typical form of the code division multiple access system is a spread spectrum multiple access (SSMA). Generally, spread spectrum systems use modulation techniques to enable multiple access, or to increase immunity to noise and interference. Spread spectrum systems make use of a sequential noise-like signal structure, for example pseudo-noise codes, to spread the normally narrow and information signal over a relatively wide band of frequencies. With code division multiple access, all earth stations within the system may transit on the same frequency at the same time. A spread spectrum receiver correlates these signals in order to retrieve the original information signal from the desired earth transmitter station. In a code division multiple access system, a specific code such as a pseudo-noise code (a PN code called a chip code used that transmissions from different earth stations are separated through envelope encryption and description techniques with each earth station using an unique chip code), or perhaps a frequency hopping pattern (e.g., a form of code division multiple access where a digital code is used to continually change the frequency of the carrier, the total available bandwidth being partitioned into smaller frequency bands, and the total transmission time being subdivided into smaller time slots, thereby enabling transmission within one limited frequency band for only a short period of time followed by transmission upon a different limited frequency band, each earth station within the code division multiple access network being assigned a different frequency hopping pattern), is assigned to each user and the user has one code, or pattern, capable of separating information at a receiving circuit.

In a code division multiple access system, there are no restrictions upon time or bandwidth. Each earth station transmitter may transmit whenever it wishes and can use any or all of the bandwidth allocated in a particular satellite system or channel. The code division multiple access system is sometimes referred to as a spread-spectrum multiple access system because there are no limitations upon bandwidth; transmissions may be spread throughout the entire allocated bandwidth spectrum for every earth station. Transmissions are separated through envelope encryption and description techniques; that is, each earth station's transmissions are encoded with a unique binary word called a chip code. In order to receive a particular earth station's transmission, a receiver must know the chip code of that station. With an encoder in the transmitter, input data (which may be pulse code modulated encoded voice band signals of raw data) is multiplied by a unique chip code to provide a code phase shift key (a PSK) that modulates an intermediate frequency carrier which is up-converted to a radio frequency for transmission. At the receiver, the radio frequency is down converted to an intermediate frequency. From the intermediate frequency, a coherent phase shift key carrier is recovered and the chip code is acquired and used to synchronize the receiver's code generator. It is important to note that although the receiver already knows the chip code, the receiver must generate the chip code synchronized in time with the received code. The recovered synchronous chip code multiples the recovered PSK carrier and generates a PSK modulates signal that contains the PSK carrier and the chip code. The received intermediate signal that contains the chip code, the PSK carrier, and the data information is compared to the received intermediate frequency signal in a correlator which, in substance, compares the two signals, essentially by subtracting one signal having the recovered PSK carrier component and the chip code component from a second signal having the received PSK carrier component, chip code component and data component, in order to recover the data. As the name implies, the correlator operates upon analog signals by looking for a correlation (that is, a similarity) between the incoming coded signal and the recovered chip code. The chip code is multiplied by the data; the product is either an in-phase code or one that is 180° out of phase with the chip code. The recovered synchronous chip code is compared in the correlator to the received signaling elements. If all of the recovered chips correlate, the correlator generates one output state; and if none of the chips correlate, a different output state. When a correlation occurs, a bit decision circuit (e.g., a threshold detector) generates a corresponding logic condition.

In comparison with any other multiple access communication systems, the CDMA system does not have a precise system capacity. That is, if the number of users increases, a signal-to-interference ratio is lowered, and the capacity of the system deteriorates gradually until a signal-to-noise ratio (SNR) is dropped to a critical value. On the other hand, the CDMA system has advantages in that a signal to be sent to a user is not easily decoded by others. Thus, maintenance of secure data transmission, which is difficult to accommodate in multiple access systems, is possible with a CDMA system. Furthermore, as earlier noted a CDMA system can be simultaneously used by many users.

In typical current designs for a conventional spread spectrum CDMA/DS receivers, a signal receiver from an antenna is amplified, and down-converted. The down-converted signal is amplified and the amplified signal is applied to automatic gain control (AGC) circuit. Since the automatic gain control circuit is coupled in the mainpath of the signal received from the antenna, it is difficult to process the signal received via the antenna to provide a multilevel signal. Moreover, since the clock recovery is performed using a general purpose amplifier subsequent to adjustment of the gain by the automatic gain control circuit, wideband, input dynamic range of the divider stages in the clock recovery stage is narrow. In short, the automatic gain control circuit as contemplated in current receiver designs, adversely limits receiving intensity and the dynamic range of the input signal.

A recent effort to improve the design of CDMA/DS synchronous communication systems is disclosed in U.S. Pat. No. 5,121,407 of Partyka et al. for SPREAD SPECTRUM COMMUNICATIONS SYSTEM. In this system, in order to overcome a short delay multipath phenomenon within a building or other structure, strong signals without the an automatic gain control circuit are transmitted by eliminating or reducing CW (continuous wave) jamming signals created by crystal based devices such as computers, terminals, etc. In this case, the effective dynamic range can be extended and the acquisition time reduced while the stability is lowered due to different clock recovery levels.

SUMMARY OF THE INVENTION

Therefore, it is an object of the present invention to provide an improved process and circuit for receiving spread spectrum signals in multiple access communication systems.

It is another object to provide a process and circuit for stably demodulating a carrier signal by maintaining a constant input amplitude during clock recovery.

It is still another object to provide an improved process and circuit for recovering a clock signal component from a broadest signal.

It is another object to provide a process and circuit for enhancing the stability of a clock signal component recovered from a broadcast signal.

It is still yet another object to provide a process and circuit with automatic limit control performed during recovery of a clock signal component from a broadcast signal.

It is a further object to provide a circuit for recovering a stable clock signal using the use of limiting amplifier and automatic level control circuits.

These and other objects may be achieved in accordance with one aspect of the present invention, a method for down-converting a spread spectrum signal with first and second local oscillating signals, amplifying the down-converted signal, separating the amplified signal into I and Q channels, and demodulating the separated signals in a receiver of a code division multiple access/direct sequence system. Such a process, when performed according to the principles of the present invention, may comprise comprises the steps of: squaring the amplified signal, producing and filtering a spread spectrum signal of twice an intermediate frequency, i.e. $2f_{IF}$, and limit-amplifying the filtered signal to maintain a given amplitude; automatically adjusting any deviation under 1dB of an input level in order to supplement an input dynamic range of the limit-amplified signal; and recovering a clock signal by controlling a voltage in response to a phase difference obtained by comparing the output of the adjusted signal with a recovery clock provided with a local oscillating signal for separating the I and Q channels, maintaining an output amplitude of the recovery clock constant, and supplying the recovery clock, in quadrature, so as to mixed with the spread spectrum signal in order to separate the spread spectrum signal into intermediate base band signals for the I and Q channels.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

In a transmitter of the spread spectrum CDMA/DS system, the data to be transmitted is mixed with a pseudo-noise (i.e., PN) code produced from a PN generator in a biphase shift keying (BPSK) modulation spread.

Figure 1:
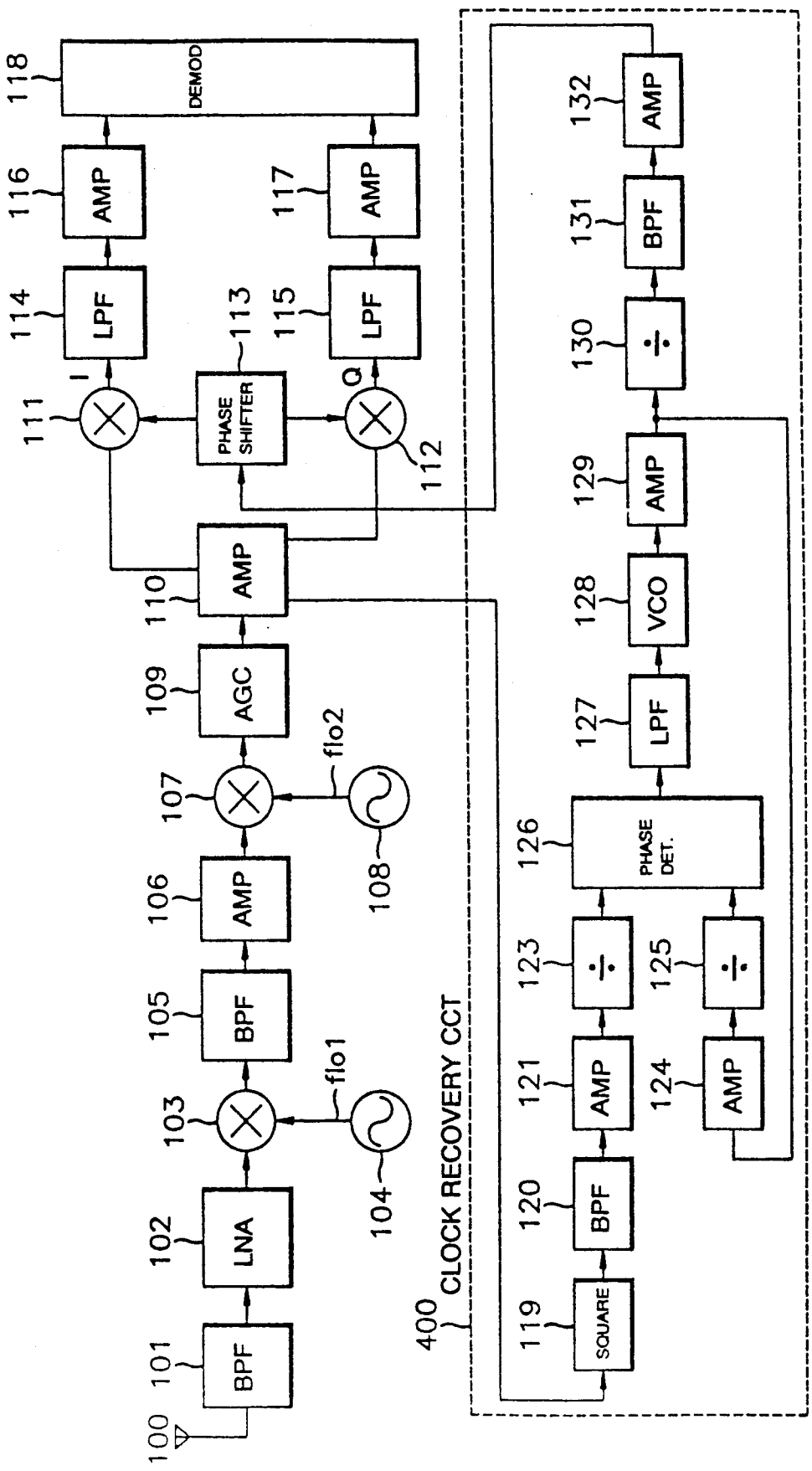
FIG. 1 is a circuit diagram of a receiver in a conventional CDMA/DS system.

Turning now to the drawings, FIG. 1 illustrates a receiver of a conventional spread spectrum CDMA/DS system, a signal received from an antenna 100 is filtered by a first band pass filter 101 and amplified by a low noise amplifier 102, and is down-converted by the output frequency $flo_1$ of a first local oscillator 104, in a first mixer 103. The down-converted signal is filtered by a second band pass filter 105, and amplified by a first amplifier 106, and is further down-converted by the output frequency $flo_2$ of a second local oscillator 108, in a second mixer 107. The mixed signal from mixer 107 is applied to an automatic gain control (AGC) circuit 109 and the output of circuit 109 is applied to a second amplifier 110. The amplified signal from amplifier 110 is supplied to third and fourth mixers 111 and 112 and output signals from mixers 111, 112 are respectively phase-shifted to I and Q channels by the output of a phase shifter 113. First and second low pass filters 114 and 115 eliminate high frequency components of the output signals from third and fourth mixers 111 and 112. The output signals from the first and second low pass filters 114 and 115 are respectively amplified by third and fourth amplifiers 116 and 117, and the amplified signals from amplifiers 116, 117 are demodulated in by demodulator 118. Meanwhile, the output of second amplifier 110 is also supplied to a clock recovery circuit 400 to enable extraction of a carrier component from a spread spectrum signal $f_{IF}$.

A squaring circuit 119 of the clock recovery circuit 400, squares the amplified signal from second amplifier 110 and a third band pass filter 120 passes a frequency component of two times the spread spectrum signal $f_{IF}$. The output of the third band pass filter 120 is amplified in a fifth amplifier 121 and divided by a factor of two in a first divider 123. A phase detector 126 detects a phase difference by comparing the output of the first divider 123 with the output of a second divider 125. The output of the phase detector 126 is filtered by a third low pass filter 127 and supplied to a voltage controlled oscillator (VCO) 128, to generate a carrier signal. The carrier signal generated from VCO 128 is amplified by a sixth amplifier 129 and fed to the second divider 125 via a seventh amplifier 124.

The output signal from the sixth amplifier 129 is provided to the phase shifter 113 with a frequency component corresponding to a coherent spread spectrum signal, a third divider 130, a fourth band pass filter 131 and an eight amplifier 132. In order to separate I and Q channels, the same phase component is used as a local oscillating signal of the third mixer 111 and the same signal, when phase-shifted by 90°, is applied to the fourth mixer 112. The separated signals received via the first and second low pass filters 114 and 115 and third and fourth amplifiers 116 and 117, respectively are subjected to reverse-spread spectrum demodulation in demodulator 118.

Since the circuit of FIG. 1 has the AGC circuit 109 within a main path for receiving a signal, it is normally difficult to process the received signal to obtain multi-level intermediate frequency signals. Moreover, since the received signal is applied to the clock recovery circuit 400 after adjusting gain by the use of a general purpose amplifier, the input dynamic range of the first and second dividers 123 and 125 is narrow. As a result, the AGC circuit 109 detrimentally influences and significantly limits the receiving intensity and the dynamic range of the input signal.

Figure 2:
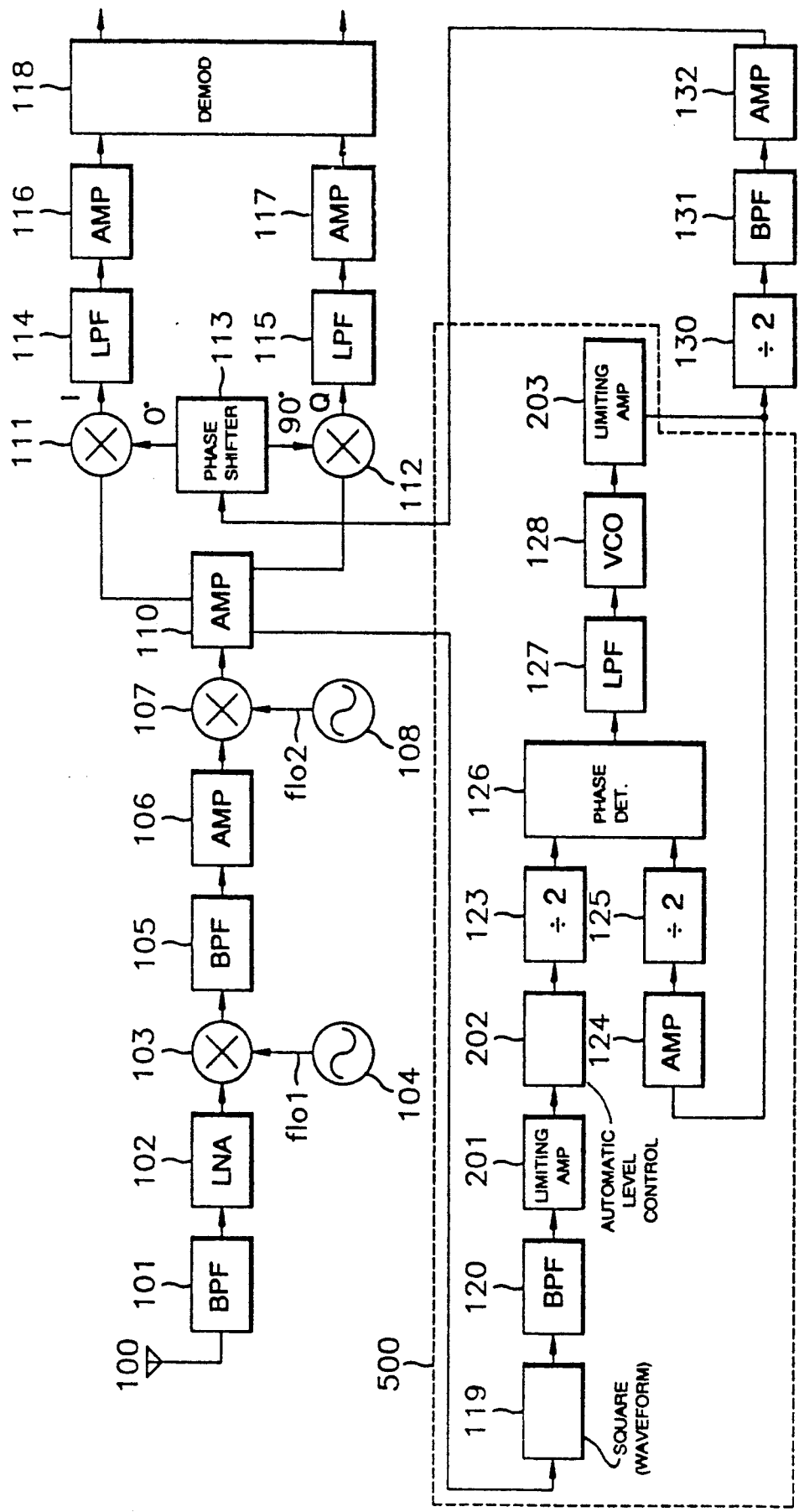
FIG. 2 is a circuit diagram of a receiver in a CDMA/DS system constructed according to the principles of the present invention.

Referring now to FIG. 2, in the receiver of the CDMA/DS system the signal received from antenna 100 is filtered in first band pass filter 101 and amplified in the low noise amplifier 102. The amplified signal is down-converted by the oscillating signals $f_{lo1}$ and $f_{lo2}$ respectively, from first and second local oscillators 104 and 108. The converted signal is amplified and power divided in the second amplifier 110. The output of second amplifier 110 is separated into I and Q channels by respectively, third and fourth mixers 111 and 112 in response to the output of phase shifter 113. The separated signals are filtered in first and second low pass filters 114 and 115 and respectively amplified in third and fourth amplifiers 116 and 117. The outputs of third and fourth amplifiers 116 and 117 are separately supplied to demodulator 118.

The output of second amplifier 110 is supplied to a clock recovery circuit 500 for extracting a carrier component from the spread spectrum signal. The carrier component extracted from clock recovery circuit 500 is applied to phase shifter 113, and quadrature signals from phase shifter 113 are mixed with the spread spectrum signal $f_{IF}$ in third and fourth mixers 111 and 112. Spread spectrum data for an intermediate frequency base band in the I channel is generated by third mixer 111, and spread spectrum data for the intermediate frequency base band in the Q channel is generated by fourth mixer 112. The separated signals are applied via the first and second low pass filters 114 and 115, respectively, and third and fourth amplifiers 116 and 117, respectively to demodulator 118 for extracting receiving data. For the synchronous demodulation, the carrier must be extracted from the spread spectrum signal because the stability of a receiver in a synchronous demodulation system depends on how consistently reliably the carrier is extracted. In demodulator 118, synchronous demodulation depends upon the stability of the carrier frequency provided to phase shifter 113.

The demodulation process performed by a receiver for a CDMA/DS system is classified as either synchronous or asynchronous demodulation, and in a preferred embodiment, synchronous demodulation method is used. In the receiver employing synchronous demodulation, it is especially important to stably extract the carrier signal from the spread spectrum signal.

Within clock recovery circuit 500, squaring circuit 119 squares (i.e., shapes into square waves the amplified signal from second amplifier 110. Third band pass filter 120 filters the squared signal from second amplifier 110 to provide a clear carrier signal component of the spread signal $f_{IF}$ having a frequency of two times the spread spectrum signal $f_{IF}$, i.e. $2 \cdot f_{IF}$. here, since the input dynamic range of the first divider (a divide by 1/N stage) 123 is narrow, it is important to maintain the amplitude of a signal constant. Hence, in order to maintain a constant amplitude for the amplified signal from the intermediate frequency base band of spread spectrum signal, the output of the third band pass filter 120 is maintained at a given amplitude by first limiting amplifier 201. By way of explanation, limiting amplification means that if the amplitude of an input signal is above a given value, the amplitude of an output signal is maintained nearly constant. Even if the input signal from filter 120 passes through the first limiting amplifier 201, the input dynamic range of the first divider 123 may be too narrow. Hence, an automatic level control circuit 202 may be connected between first limiting amplifier 201 and first divider 123, and an input level deviation is precisely adjusted to a value below one decibel. First divider 123 divides the spread spectrum signal by two. Phase detector 126 compares the output of first divider 123 with the output of second divider 125. The output of the phase detector 126 is filtered in third low pass filter 127, and supplied to voltage controlled oscillator 128 to generate a synchronous carrier signal. The output level of voltage controlled oscillator 128 is adjusted in a second limiting amplifier 203. The output of second limiting amplifier 203 is amplified in sixth amplifier 124 and divided by two in second divider 125. Second limiting amplifier 203 maintains the output of voltage controlled oscillator 128 at a given level; the signal from amplifier 203 is divided by two by third divider 130. The output of third divider 130 is band pass filter by fourth band pass filter 131, amplified by seventh amplifier 132, and applied to phase shifter 113. Phase shifter 113 converts the output phase of the carrier component provided by seventh amplifier 132 into 0° and 90° quadrature phase signals.

As described above, carrier signal is may be reliably extracted from spread spectrum signal according to the foregoing principles. That is, in order to stabilize the clock recovery circuit to enable extraction of the carrier signal from the spread spectrum signal in the receiver of a spread spectrum CDMA/DS synchronous system, the input level of the divider or prescaler should be constantly maintained, and thus, a stable receiver output can be obtained independently of such considerations as, for example, the number of users of the system.

The foregoing description of a preferred embodiment and accompanying illustrations have been set out by way of example, not by way of limitation. Various modifications to the particular embodiment disclosed may be made according to the principles of the present invention. For example, the signal processed by the clock recovery circuit may be N times the spread spectrum signal $f_{IF}$, i.e. $Nf_{IF}$, when N is a value other than two. Further modifications as are apparent to those skilled in the art, may be made without departing from the spirit and scope of the present invention, its scope being defined in the appended claims.

What is claimed is:

1. A process for down-converting a spread spectrum signal with first and second local oscillating signals, generating an amplified signal by amplifying the down-converted signal, separating the amplified signal into intermediate base band signals for I and Q channels, and demodulating the separated signals in a code division multiple access/direct sequence receiver, wherein said step of separating the amplified signal into intermediate base band signals for I and Q channels comprises the steps of:

squaring said amplified signal to provide a square wave signal, producing a filtered signal by filtering said square wave signal, said filtered signal being a spread spectrum signal of N times an intermediate frequency, and limit-amplifying the filtered signal to provide a limited signal maintained at a given amplitude;

generating an adjusted signal by automatically adjusting an input amplitude of said limited signal to exhibit a deviation of less than one decibel;

dividing a frequency of said automatically adjusted signal by N to produce an intermediate frequency signal;

recovering a clock signal by making a comparison of said intermediate frequency signal with a feedback signal, producing an oscillation signal in response to a phase difference obtained by said comparison, and limit-amplifying said oscillation signal to recover said clock signal;

maintaining said oscillating signal at a constant amplitude;

dividing a frequency of said oscillation signal by N to produce said feedback signal; and dividing said frequency of said oscillation signal to produce a stable carrier signal, phase shifting said stable carrier signal, in quadrature, to produce first and second carrier signals and separately mixing said amplified signal with the first and second carrier signals to provide said intermediate base band signals for said I and Q channels.

2. A circuit for a receiver of a code division multiple access/direct sequence system, wherein a received spread spectrum signal is down-converted by first and second local oscillation signals, the down-converted signal is amplified, the amplified signal is separated into intermediate base band signals for I and Q channels in first and second mixers in response with the output of a phase shifter, and the separated signals are demodulated in a synchronous demodulator, said circuit comprising:

first means for squaring said amplified signal to produce a square wave signal, producing a filtered signal by filtering said square wave signal, said filtered signal having a frequency of N times an intermediate frequency, and limit-amplifying the filtered signal to produce a limited signal maintained at a given amplitude;

second means for generating an adjusted signal by automatically adjusting an input amplitude of said limited signal to a deviation less than a select valve;

third means for recovering a clock signal by dividing said adjusted signal to produce an intermediate frequency signal, producing a feedback by amplifying and dividing said intermediate signal, comparing said intermediate frequency signal with said feedback signal to produce a phase difference signal, producing an oscillation signal in response to said phase difference signal, and limit-amplifying said oscillation signal to recover said clock signal; and fourth means for providing a carrier signal by maintaining constant an output amplitude of the clock signal, said carrier signal being provided to said phase shifter for phase shifting said stable carrier signal, in quadrature, to produce first and second carrier signals and supplying the first and second carrier signals to said first and second mixers, wherein said amplified signal provided to said first and second mixers is divided into said intermediate base band signals.

3. The circuit as claimed in claim 2, wherein said first means comprises a squaring circuit for receiving said amplified signal, a band pass filter for filtering said square wave signal and a limiting amplifier for limit-amplifying said filtered signal to said given amplitude.

4. The circuit as claimed in claim 2, wherein said second means comprises an automatic level control circuit for receiving said limited signal.

5. The circuit as claimed in claim 2, wherein said third means comprises:
first dividing means for receiving said automatically adjusted signal and for dividing by N to produce said intermediate frequency signal;
first amplifying means for receiving and amplifying said clock signal;
second dividing means for receiving and/or dividing the amplified clock signal to produce said feedback signal;
phase detection means for producing said phase difference signal;
means for filtering said phase difference signal;
voltage controlled oscillation means for producing said oscillation signal in response to the filtered phase difference signal; and
second amplifying means for limiting-amplifying said oscillation signal to provide said clock signal.

6. The circuit as claimed in claim 2, wherein said fourth means comprises:
means for dividing said clock signal to produce a divided clock signal;
means for filtering said divided clock signal; and
means for amplifying the filtered divided clock signal for producing said stable carrier signal.

7. A circuit for a receiver of a code division multiple access/direct sequence system, said circuit comprising:
down conversion means for down converting a received spread spectrum signal and for generating a down-converted signal;
first amplifier means for amplifying and power dividing said down-converted signal and for generating a first amplified signal;
a squaring circuit for squaring said first amplified signal and for generating a squared signal;
first filter means for filtering said squared signal;
first limiting-amplifying means for receiving the filtered squared signal and for generating a limited signal maintained at a given level;
automatic adjusting means for automatically adjusting an input level of said limited signal to have a deviation under a selected valve to produce an automatically adjusted signal having a supplemented input dynamic range;
first divider means for dividing said limited signal by N to produce an intermediate frequency signal;
a phase detector for comparing said intermediate frequency signal to a feedback signal and for producing a phase difference signal;
first means for filtering said phase difference signal, generating an oscillation signal in response to the filtered difference signal and limiting-amplifying the oscillation signal to produce a recovered clock signal;
second amplifier means for amplifying said recovered clock signal;
second divider means for dividing the amplified recovered clock signal to produce said feedback signal;
second means for generating a divided clock signal by dividing said recovered clock signal, filtering the divided clock signal and amplifying the filtered divided clock signal to generate a stable carrier signal;

third means for receiving said stable carrier signal and for producing a first carrier signal and a second carrier signal shifted in phase from said first carrier signal;

fourth means for receiving and separating said first amplified signal into first and second intermediated base band signals in response to said first and second carrier signals, respectively; and fifth means for synchronously demodulating said first and second intermediate base band signals.

8. The circuit as claimed in claim 7, wherein said down conversion means comprises first and second mixers responsive to first and second local oscillation signals, respectively.

9. The circuit as claimed in claim 7, wherein said first filter means comprises a band pass filter, and said first limiting-amplifying means comprises a limiting amplifier.

10. The circuit as claimed in claim 7, wherein said automatic adjusting means comprises an automatic level control circuit.

11. The circuit as claimed in claim 7, wherein said first divider means comprises a divider and N is equal to 2.

12. The circuit as claimed in claim 7, wherein said first means comprises:
means for filtering said phase difference signal;
means for generating said oscillation signal in response to the filtered difference signal; and
means for producing said recovered clock signal in response to said oscillation signal.

13. The circuit as claimed in claim 7, wherein said second means comprises:
means for dividing said recovered clock signal by two to provide a divided signal;
means for filtering said divided signal; and
means for amplifying the filtered signal to generate the stable carrier signal.

14. The circuit as claimed in claim 7, wherein said third means comprises means for phase shifting said stable carrier signal in quadrature to provide quadrative phases of said carrier signal.

15. The circuit as claimed in claim 7, wherein said fourth means comprises means separately for mixing said first and second carrier signals, with said first amplified signal, to respectively provide said first intermediate base band signal for said I channel and said second mixer outputting said second intermediate base band signal for said Q channel.

16. The circuit as claimed in claim 12, wherein said second means comprises:
means for dividing said recovered clock signal by two to provide a divided signal;
means for filtering said divided signal; and
means for amplifying the filtered signal to generate the stable carrier signal.

17. The circuit as claimed in claim 12, wherein said third means comprises means for phase shifting said stable carrier signal in quadrature to provide quadrative phases of said carrier signal.

18. The circuit as claimed in claim 12, wherein said fourth means comprises means separately for mixing said first and second carrier signals, with said first amplified signal, to respectively provide said first intermediate base band signal for said I channel and said second mixer outputting said second intermediate base band signal for said Q channel.

19. The circuit as claimed in claim 13, wherein said third means comprises means for phase shifting said stable carrier signal in quadrature to provide quadrative phases of said carrier signal.

20. The circuit as claimed in claim 13, wherein said fourth means comprises means separately for mixing said first and second carrier signals, with said first amplified signal, to respectively provide said first intermediate base band signal for said I channel and said second mixer outputting said second intermediate base band signal for said Q channel.

21. A process for receiving a code division broadcast signal having a data component mixed with a code, comprising:
generating an intermediate frequency signal by down-converting a said code division broadcast signal;
squaring said intermediate signal to provide a square wave signal;
producing a filtered signal by filtering said square wave signal;
limit-amplifying the filtered signal to provide a first amplitude-limited signal maintained at a given amplitude;
generating an adjusted signal by automatically adjusting an input amplitude of said first amplitude-limited signal to exhibit a deviation in amplitude of less than a decibel value;
dividing a frequency of said automatically adjusted signal by N to produce a divided frequency signal;
making a comparison of said divided frequency signal with a feedback signal;
producing an oscillation signal in response to said comparison;
limit-amplifying said oscillation signal to provide a second amplitude-limited signal maintained at a selected amplitude;
maintaining said second amplitude-limited signal at a constant amplitude;
dividing a frequency of said second amplitude-limited signal by N to produce said feedback signal;
dividing said frequency of said second amplitude-limited signal to produce a carrier signal;
phase shifting said carrier signal, in quadrature, to produce first and secondcarrier signals and;
separately mixing said amplified signal with the first carrier signal and said second carrier signal to provide said intermediate base band signals for said I and Q channels.

22. The process of claim 21, further comprised of:
making said comparison by obtaining a phase difference between said divided frequency signal and said feedback signal; and
producing said oscillation signal in response to said comparison.

* * * * *